July 25, 1967 E. J. BRETON 3,332,751
CORROSION-INHIBITED SINTERED COMPOSITE OF A
METAL MATRIX WITH OCCLUDED CEMENT
Filed Nov. 4, 1965 4 Sheets-Sheet 1

CEMENT ZONES IN SYSTEM $CaO$-$Al_2O_3$-$SiO_2$

INVENTOR
ERNEST J. BRETON

BY Harry J. McCauley

ATTORNEY

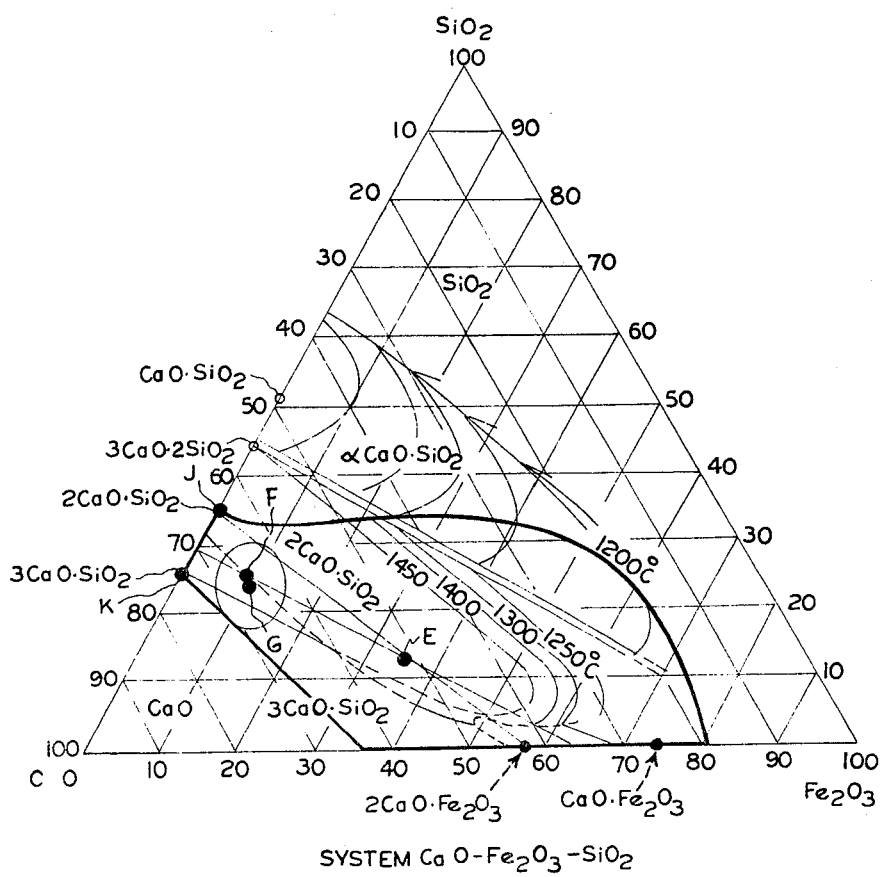
SYSTEM CaO-Fe₂O₃-SiO₂
FIG.I(B)

IRON-CEMENT COMPOSITE BEFORE EXPOSURE
TO WATER (100X POLARIZED LIGHT).

IRON-CEMENT COMPOSITE AFTER EXPOSURE
TO WATER (100X POLARIZED LIGHT).

July 25, 1967 E. J. BRETON 3,332,751
CORROSION-INHIBITED SINTERED COMPOSITE OF A
METAL MATRIX WITH OCCLUDED CEMENT
Filed Nov. 4, 1965 4 Sheets-Sheet 4

FIG. 4(L)

Fe - 30 VOL. % CEMENT (DARK  50X
AREAS ARE METAL, LIGHT CEMENT)

FIG. 4(M)

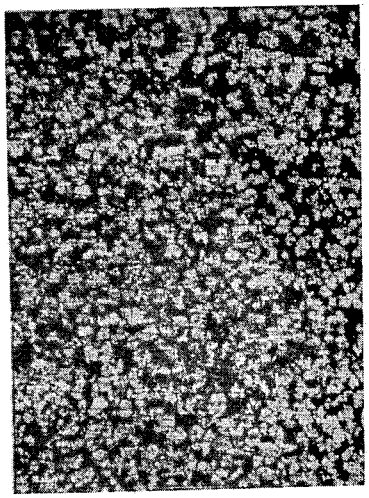

H$_2$O + Fe + 30 VOL. % CEMENT  30X
(METAL AREAS ARE LIGHT, CONCRETE DARK)

FIG. 4(N)

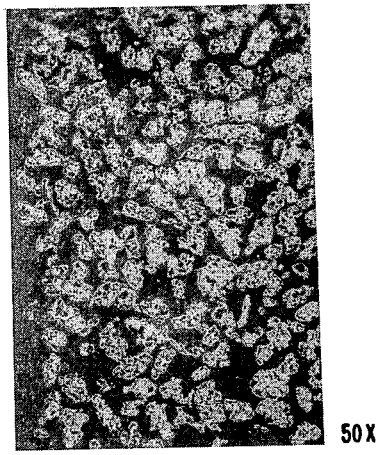

50X

H$_2$O + Fe + 30 VOL. % CEMENT,
FIRED IN AIR 4½ HR. AT
650°C.

FIG. 4(O)

50X

H$_2$O + Fe + 30 VOL. % CEMENT,
FIRED IN AIR 4½ HR. AT 1000°C.

(METAL AREAS ARE LIGHT,
CONCRETE DARK)

INVENTOR
ERNEST J. BRETON

BY  Harry J. McCauley

ATTORNEY

United States Patent Office 3,332,751
Patented July 25, 1967

3,332,751
CORROSION-INHIBITED SINTERED COMPOSITE OF A METAL MATRIX WITH OCCLUDED CEMENT
Ernest J. Breton, West Grove, Pa., assignor to E. I. du Pont de Nemours and Company, Wilmington, Del., a corporation of Delaware
Filed Nov. 4, 1965, Ser. No. 506,367
7 Claims. (Cl. 29—182.5)

This invention relates to corrosion-inhibited metal-cement compositions, and also to methods for their manufacture.

Applicant had previously discovered that quite effective corrosion inhibition of metals could be achieved by sintering the particulate metal with particulate glass of a composition such that corrosion-inhibiting substances were slowly released therefrom by water leaching, and filed U.S. patent application Ser. No. 286,856 (now Patent 3,205,566) on that invention. Subsequently, he continued his research in an effort to discover yet other, and possibly more effective, corrosion-inhibitors and eventually devised the compositions and methods of manufacture of this invention. The new corrosion inhibition is an improvement over the prior art in that it develops an extremely adherent protective gel-like barrier, which isolates the metal to be protected from the corrosive environment. At the same time, the protective gel-like film is such that it can be used in conjunction with the corrosion-inhibitors of said U.S. Patent 3,205,566 and can even be fabricated in attractive colorations and patterns by the conjoint use of colored particulate glass as taught by applicant in his U.S. Patent 3,165,821.

An object of this invention is the improved inhibition of metals by incorporation of a former of a protective gel-like film or coating in intimate association therewith. Other objects of this invention include the provision of a corrosion-inhibited metal composition wherein the metallic characteristics are retained largely unaltered, the provisions of a process of manufacture which is relatively simple in effectuation and low in cost, and the provision of a corrosion-inhibited metal manufacture which is high in strength, pleasing in appearance and extremely durable under exposure to the usual corrosive environments, particularly outdoor atmospheric and submarine.

The manner in which these and other objects of this invention are attained will become apparent from the following detailed description and the drawings presented in illustration, in which:

FIG. 1(A) is a ternary phase diagram delineating the various cement zones for the system

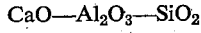

$$CaO-Al_2O_3-SiO_2$$

some of the hydraulic cement compositions effective in this invention being those encompassed within the heavy line enclosure.

FIG. 4(L) is a photomicrograph (50×, polarized light) showing an iron-30 vol. percent cement composition prepared according to this invention wherein the dark areas are metal whereas the light areas are cement.

Figure 1A:
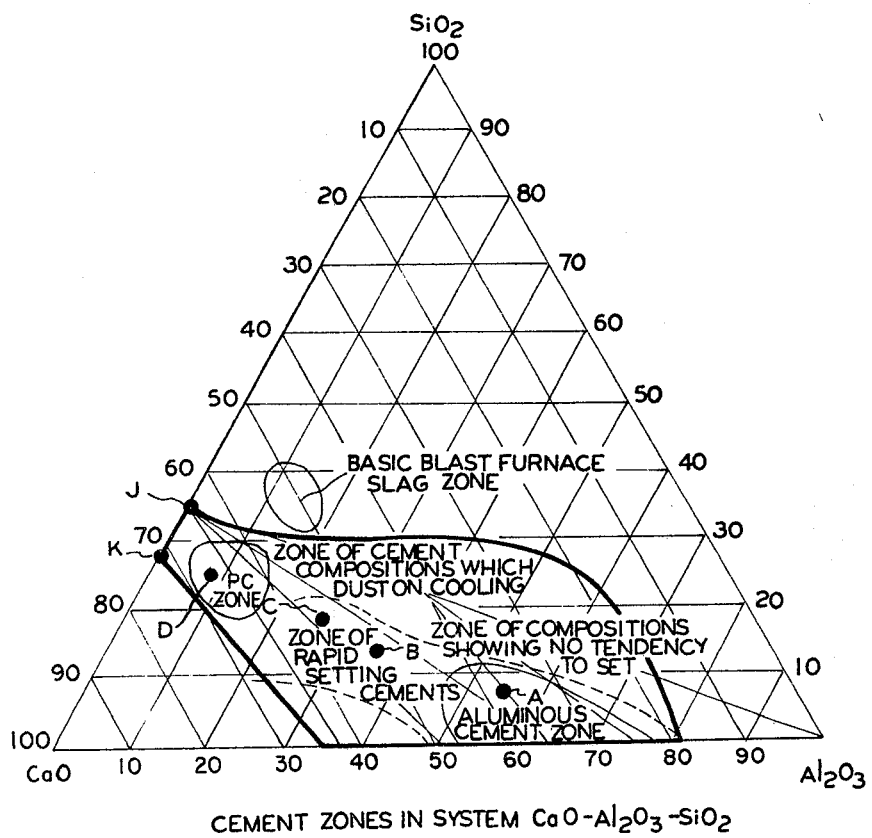
FIG. 1(B) is a ternary phase diagram of hydraulic cement compositions useful in this invention for the system $CaO-Fe_2O_3-SiO_2$.

FIG. 4(M) is a photomicrograph (30×, ordinary light) of an iron-concrete specimen wherein the dry cement volume was 30%, and the metal phase appears light whereas the concrete is dark, FIG. 4(N) is a photomicrograph (50×, ordinary light) of an iron-concrete of the same composition as that of FIG. 4(M), fired for 4½ hours at 650° C., wherein the metal phase appears light and the concrete dark, and FIG. 4(O) is a photomicrograph (50×, ordinary light) of an iron-concrete of the same composition as that of FIG. 4(M), fired for 4½ hours at 1000° C., wherein the metal phase appears light and the concrete dark.

Generally, this invention consists of a manufacture of improved corrosion resistance comprising a sintered metal-nonhydrated cement composition wherein said cement is of inorganic composition and possessed of hydraulic activity adapted to develop an adherent, substantially continuous, gel-like film over the surface of the composite as a consequence of hydration upon exposure to moisture, adjacent sites of said cement within said metal being separated at spacings not exceeding about 0.2 mm., and a method for making such manufactures.

The unusual properties obtained by sintering particulate metal and glass into compositions, as taught in applicant's U.S. Patents 3,205,566 and 3,165,821, hereinbefore referred to, led to attempts to composite yet other substances than glass with metals, the objective again being to retain the utmost in metallic properties while, at the same time, obtain additional benefits contributed by the non-metallic phase. On the basis of known enamel technology, strong metal-to-glass bonding as effected in the earlier work was perhaps to be expected; however, when hydraulic cements, typified by Portland cement, were contemplated as substitutes for the glass phase, the nature of the bonding was completely unpredictable. Surprisingly, when the particle sizes and relative proportions of the metals and cement were adjusted suitably on the basis of experiment, it was found that extremely strong metal-cement composites could be fabricated. These were subsequently subjected to a lengthy series of corrosion tests, with and without corrosion inhibitory substances added in supplementation, and the corrosion resistance propensities explored. It was discovered that high order corrosion inhibition was readily obtainable with the hydraulic cement alone, and that this inhibition was further improved with additives such as those taught in said U.S. Patent 3,205,566. Finally, the addition of a glass phase as a tertiary phase ingredient was explored, and it was found that, in many cases, the composite product was thereby substantially improved in metal-cement bond strength. Moreover, the compatibility of glass with both the metal and cement phases afforded a method of color impartation via the general route taught in U.S. Patent 3,165,821 supra.

The reason for the corrosion inhibition obtained using hydraulic cements as the non-metallic phase of the composite, either alone or with glass added as a third phase, is believed due at least in part to the development of a highly adherent gel-like protective film over the entire surface of the composite under exposure to a water-containing corrosive environment. I have verified the existence of such a film by microscopic examination of specimens as hereinafter described; however, the orderly description of this invention first necessitates some advance description of cement composition.

Hydraulic cements, of which commercially available Portland cement is the most familiar example, are characterized by their ability to set and harden on mixing with water at room temperature. The chemistry of these cements has been studied very extensively and such literature references as "The Chemistry of Portland Cements" by R. H. Bogue, Reinhold Publishing Corp., 2nd edition 1955, "The Chemistry of Cements" by H. F. W. Taylor, Academic Press, London and New York, vol I, 1964, and the article "The Chemistry of Concrete" by Stephen Brunauer and L. E. Copeland, Scientific American, 210 No. 4, pp. 81–92 (1964), give much valuable information on the hydration reactions which accompany the setting and hardening processes. One of the hydration products of Portland cement is a highly adhesive gel-like substance, consisting of a hydrated calcium silicate, sometimes referred to as tobermorite gel, and part of the cement setting and hardening action has been attributed to this substance. It will be understood that the setting of a hydraulic cement depends upon the presence of water and can take place over a period of many years, depending upon the cement formulation and the rate of exposure to moisture. It is this progressive hydration that is relied upon according to this invention to obtain regeneration of the corrosion-protective barrier film, as such regeneration may from time to time be necessary to barrier restoration; however, normally, the protective film is so highly adherent that regeneration is required only after severe abrasion or the like may have removed areas of film.

The most common types of hydraulic cements are represented on the phase diagrams of FIGS. 1(A) and 1(B), which give the hydraulic cement composition ranges for the $CaO$—$Al_2O_3$—$SiO_2$ and $CaO$—$Fe_2O_3$—$SiO_2$ systems, respectively. The diagram of FIG. 1(A) is discussed at Page 25 et seq. of the book entitled "The Chemistry of Cement and Concrete" by F. M. Lea and C. H. Desch, revised by Lea, and published in 1956 by St. Martin's Press, Inc., New York, and the preferred region of hydraulic activity for practice of this invention is that bounded by the heavy lines. Portland cement is represented on FIGURE 1(A) in the zone labelled "P C Zone."

In FIGURES 1(A) and 1(B), the various points labelled A through K represents the approximate compositions of test samples reported hereinafter in the examples. The alphabetic letters correspond to the sample designations given in these examples.

It has been estimated that approximately 75% by weight of Portland cement clinker is composed of tricalcium silicate, assigned the formula ($3CaO \cdot SiO_2$) and frequently symbolized as $C_3S$, plus dicalcium silicate, formula ($2CaO \cdot SiO_2$), symbolized $C_2S$. These two components react with water to form the hydrate denoted tobermorite gel, having the formula ($3CaO \cdot 2SiO_2 \cdot 3H_2O$) which constitutes about 50% by weight of fully-hydrated Portland cement.

FIGURE 1(B) represents the phase diagram of the system made up of calcium oxide, silica, and iron oxide, the latter having replaced the aluminum oxide of FIG. 1(A). Here, too, the alphabetic letters designate compositions of samples hereinafter correspondingly lettered, and the heavy line outlines the approximate boundaries of the regions of hydraulic activity. Similar relationships exist for other hydraulically active systems, where the alumina and/or iron oxide are more or less replaced by other metal oxides of the $R_2O_3$ type, where R may be any trivalent metal, e.g., chromium, and the calcium oxide is replaced by other similar oxides such as beryllium, magnesium, strontium, or barium.

It has been postulated that pure form $C_3S$ would perhaps be the ideal hydraulic cement, but its preparation in pure form is prohibitively expensive. However, even impure $C_3S$ is preferred for utilization according to this invention in place of commercial Portland cements, due to the fact that the latter contain setting retarders or other additives, such as calcium sulfate, for example, which accelerate corrosion and thus work in opposition to the objectives sought.

Further, I have found that good corrosion protection is not critically dependent on the silica content of the hydraulic cement, as is demonstrated by Sample A, FIG. 1(A), which lies well within the "Aluminous Cement Zone." Although this region is less preferred for commercial cements, compositions of the present invention made from hydraulically active cements with these analyses have been found effective in imparting resistance to corrosion. Thus, the development of tobermorite gel, which is of course dependent on the presence of silica, does not clearly appear to be essential to corrosion protection according to this invention, so long as a protective gel-like barrier, regardless of its specific composition, develops as a result of hydration under exposure to the environment.

In general, hydraulic cements meeting Standard Test Method, ASTM Designation: C191–58, adopted 1952, revised 1958, have proved satisfactory for my purposes. This test determines the penetration of a 1 mm. dia. needle into a test specimen at prescribed loadings and moisture conditions spaced apart predetermined time intervals. As evidence of hydraulicity, the needle penetration becomes less and less until the desired setting time is indicated over the elapsed time of the test by a penetration of 25 mm. or less.

Specifically excluded from utilization in my invention are cements which incorporate constituents which are themselves corrosive, or which develop corrosive substances upon hydration, such as by liberation of corrosive radicals. Cements in this category include plaster of Paris, i.e., $CaSO_4 \cdot \frac{1}{2}H_2O$, and magnesium oxychloride.

The preferred method of compositing metals with cements according to this invention is by powder metallurgy, using sintering and hot working, so that very intimate association of the metal and cement phases is achieved. If desired, however, both the metallic component and the hydraulically active cement constituent can be intimately mixed one with the other in the molten phase.

There is no close restriction as regards particle size, but very good composites have been obtained with −100 mesh iron and cement powders, and such material was used in the examples hereinafter reported. As to composition, the hydraulic cement can constitute from about 5% by volume to 75% by volume, although a range of 15 volume percent to 30 volume percent of cement is preferred for retention of the best metal characteristics.

On the basis of the normal size distribution of the ground materials, the 5 volume percent minimum cement concentration corresponds to an average spacing of the protective cement particles of about 0.2 millimeter. Even at this maximum spacing, marked corrosion protection was achieved.

Corrosion inhibition improvement additives include chromates, phosphates, tungstates, molybdates and certain alkaline earths, all as taught in Patent 3,205,566 supra, and the addition of certain unhydraulic glasses as therein described is positively beneficial, which glass contributes an independent binding action between the cement and metal particles.

The hydraulic cement employed should withstand temperatures well in excess of 1000° C. to insure thorough sintering to metals and this poses no problem at all for Portland type cements, which are very refractory. The sintering is intensive, because it is essential that a substantially continuous metal structure be formed containing occluded cement phase in very intimate association throughout the metal. The cement phase serves to isolate corrosion-inhibiting additives from contact with neighboring metal, thereby preventing reaction therewith, which is a likelihood at the high sintering temperatures employed, and it is usually highly important to the attainment of continuity of the metal phase that the sintering and hot-working be conducted in a reducing atmosphere, in order to avoid the formation of oxide layers which would prevent adjacent metal particles from welding at contact points.

Good sintering can be obtained by simply heating without any compaction; however, it is preferred to hot-work the composites intensively in order to produce high densifications, as the mechanical properties are thereby improved. Hot-working producing a reduction in thickness of approximately 50% has proved particularly effective, and this order of working was adhered to for all the examples hereinafter described.

I have found that compaction also has some effect on corrosion resistance, in that best corrosion inhibition was achieved (refer Example 4) under "complete compaction," by which is meant that after which there exists no detectible pores under 200× magnification.

The following examples teach effective compositions according to this invention besides illustrating the principles upon which operation is based.

Example 1

The purpose of this example was to demonstrate the corrosion resistance obtained by compositing hydraulic cement alone with iron powder as metal phase. The iron component used here, and also in later Examples 2–9, inclusive, was minus 100 mesh MH–100 Hoeganaes Sponge Iron Corp., Riverton, N.J., iron powder having the following chemical and screen analysis:

| Chemical Analysis (Weight Percent) | | Screen Analysis | |
|---|---|---|---|
| | | Tyler Screen Mesh | Percent by Wt. Retained |
| Fe | 98.8 | +100 | 0.1 |
| SiO$_2$ | 0.1 | +150 | 7.0 |
| C | 0.04 | +200 | 22.0 |
| H$_2$ loss | 0.3 | +250 | 17.0 |
| S | 0.007 | +325 | 27.0 |
| P | 0.01 | −325 | −27.0 |

The hydraulic cements were intimate mixtures (parts by weight) of the −100 mesh size individual ingredients tabulated, made up by firing in kyanite crucibles in air at the reported temperatures:

| Sample | CaO | SiO$_2$ | Al$_2$O$_3$ | Fe$_2$O$_3$ | Sintering Temp., °C. |
|---|---|---|---|---|---|
| A | 45 | 7 | 48 | | 1,350 |
| B | 50.5 | 12.5 | 37 | | 1,400 |
| C | 57.5 | 18 | 24.5 | | 1,400 |
| D | 66 | 26 | 8 | | 1,400 |
| E | 50.5 | 12.5 | | 37 | 1,300 |
| F | 66 | 26 | | 8 | 1,350 |

All of the calcined material was ground to −325 mesh before mixing with the metal. Individual samples were then formulated by mixing, at room temperature, 70% by volume of the iron powder with 30% by volume of the cement mixtures, sealing within a 1½" stainless steel pipe welded closed, and then hot-rolling at 1100° C. to an extent reducing the thickness of the sealed pipe to ⅜"–½", which bonded the ingredients into an integral mass. After removal from the pipe, the samples were dry-machined to give test pieces measuring approximately 2" x 3" x ¼".

The samples were subjected to a corrosion test at room temperature wherein individual specimens were placed on end at an angle of approximately 85° to the horizontal in individual jars filled with tap water, so that only about one-third of the specimen extended above water. The purpose of this was to maintain conditions for water-line corrosion, which is a particularly aggressive type. A sintered iron control specimen was separately tested in order to obtain a comparison with the same particulate metal, lacking, however, an added cement phase. The following was observed:

| | Appearance |
|---|---|
| Iron control | Rusting commenced in two hours and continued unabated throughout the test. |
| Cement-containing samples: | |
| A | No rust in 120 hours. Some white residue formed at 100 hours localized at the water line. |
| B | 5 rust spots of ⅛" average dia. within 3 hours; however, these did not grow. |
| C | No rust in 120 hours. |
| D | Rust started quickly, continuing for 48 hours, then tapering off in rate. |
| E | Same as Sample D. |
| F | No rust in 120 hours. |

In summary, all of the composites displayed far better corrosion resistance than the iron control. Even Samples D and E, which were the worst of the group, accumulated much less rust in the 120 hour test period than the iron control.

Interestingly, the composition of cement D was well within the area of commercial Portland cements, which indicates that, although commercial Portland cements afford some corrosion protection when used according to this invention, other hydraulic cements as herein taught are decidedly more effective.

Example 2

The purpose of this example was to show the enhanced corrosion protection resulting from the incorporation of known water-ionizable corrosion inhibitors such as taught in U.S.P. 3,205,566 supra, as an ingredient in iron-hydraulic cement composites.

*Preparation of the hydraulic cement components.*—The following cement mixtures (compositions in parts by weight), one with and one without the inhibitor MoO$_3$ added, were fired for 3 hours in air at 1300° C. using kyanite crucibles. After firing, the clinkers were dry-ground to pass 100 mesh.

| Sample | SiO$_2$ | CaO | Fe$_2$O$_3$ | MoO$_3$ |
|---|---|---|---|---|
| G | 85 | 65 | 10 | |
| H | 25 | 60 | 10 | 14.3 |

*Preparation of composites.*—Minus 100 mesh MH–100 Hoeganaes iron powder, of composition and screen analysis given in Example 1, was mixed with the cement powder in the ratio of 70 parts by volume iron, 30 parts by volume cement. The iron-cement mixtures were sealed in 1½" dia. stainless steel pipe sections and hot rolled from 1100° C. to a final sealed pipe thickness of about ⅜"–½". Samples measuring 2" x 3" x ¼" were then prepared from the bonded rolled product by dry machining.

*Corrosion test.*—The test duplicated that of Example 1, except that the duration was 384 hours.

|  | Appearance |
|---|---|
| Iron control | Draining rust (i.e., that which continues to form and to drain away from the metal surface) started within 2 hours and continued unabated. The entire submerged area of sample was rusted. |
| Cement-containing sample: | |
| G | In 384 hours decided water-line corrosion appeared; however the overall appearance of the specimen was superior to the control after only 4 hours exposure for the latter. |
| H | No rust in 384 hours. |

From the foregoing, it is apparent that substitution of $MoO_3$ for some of the CaO in the cement component imparted superior corrosion resistance.

Samples of these same iron-cement composites, together with a plain sintered iron control sample, were subjected to atmospheric corrosion out-of-doors from May 24 through June 27, 1964, at a test site in West Grove, Pennsylvania. The specimens were exposed in upright position in an unshaded location for the full test, a period during which there was substantial rainfall on 9 individual days and, of course, heavy dew every morning and evening.

Under these conditions the iron control developed a 100% rust coat following the first day of rain, which was on the third day of the test. This deepened progressively to a heavy rust covering by test end.

In contrast, Sample G had 30% light rust distribution after 5 days of rain, which progressed to moderately heavy generally distributed rust by the final day. Sample H survived the test with development of only 60% surface coverage of very light rust.

Example 3

The purpose of this example was to show the superior corrosion resistance obtained with iron-cement composites wherein the cement component was essentially dicalcium silicate or tricalcium silicate exclusively.

*Preparation of cements.*—The following powdered (—100 mesh) constituents (in parts by weight) were employed to make up the two cement powders:

| Sample | Constituents | | Sintering Temperature, °C. |
|---|---|---|---|
|  | CaO | $SiO_2$ |  |
| J. Dicalcium silicate | 112 | 60 | 1,430 |
| K. Tricalcium silicate | 168 | 60 | 1,430 |

The CaO was first mixed with $SiO_2$ in water to get a paste, which was dried and fired at the indicated temperature for 3 hours. In the case of the $C_3S$, i.e., the tricalcium silicate, Sample K, the cooled clinker was reground in water and refired for 3 hours at the same temperature (approximately 1500° C.), the cycle being repeated three times until dehydrated $C_3S$ was obtained as the principal component present, a fact verified by X-ray diffraction.

The final particle sizes of both clinkers were 100% through a 200 mesh screen.

The screen analysis of the $C_3S$ was as follows.

| Tyler screen mesh: | Percent by wt. retained |
|---|---|
| +100 | 0.0 |
| +200 | 1.0 |
| +325 | 10.4 |
| −325 | 88.6 |

*Preparation of composite.*—Minus 100 mesh MH–100 Hoeganaes iron powder was intimately mixed with one or the other of the cements individually in the proportions 70% by volume iron, 30% by volume cement. The mixtures were then sealed within stainless steel cans and hot rolled from 1000° C., effecting a reduction in thickness to the same extent as described for Examples 1 and 2. Samples measuring approximately 2″ x 3″ x ¼″ were dry-machined from the hot-rolled compacts and corrosion-tested as hereinafter described.

*Corrosion test.*—The corrosion test was identical to that described for Example 1, with results as follows:

|  | Appearance |
|---|---|
| Iron control | Draining rust was visually apparent in 2 hours, and deepened without abatement until the test was concluded after 960 hours duration. |
| Sample containing: | |
| J. Dicalcium silicate | No rust until 150 hours. In 216 hours visible water-line rust. In 960 hours moderate generalized rust. |
| K. Tricalcium silicate | No rust in water in 960 hours. Trace of rust just above water line. |

Obviously, the tricalcium silicate is a decidedly superior hydraulic cement component and, it is believed, the reason for this might be attributed to its unique mechanism of hydration. Thus, Taylor in "The Chemistry of Cements," supra, page 380 et seq., reports that, during hydration of tricalcium silicate, fibers radiate and soon spread into a felt-like coating. In contrast, dicalcium silicate does not develop such an adherent coating of hydrated particles but, instead, reacts by penetration of water, which causes splitting up of the entire crystal into columnar particles. Theory and observation both support the conclusion that tricalcium silicate reacts with water by dissolution, reprecipitation and growth of hydrate crystals, whereas dicalcium silicate reacts by internal topochemical hydration. Nevertheless, both appear to form adherent protective gel films.

Example 4

The purpose of this example was to demonstrate the enhancement of calcium trisilicate corrosion inhibition by incorporation therewith, as a third ingredient, $ZnCrO_4$, a known corrosion inhibitor.

*Procedure.*—85 parts by weight of minus 100-mesh tricalcium silicate was ball-milled with 15 parts by weight of minus 325 mesh $ZnCrO_4$. The resulting mix was then intimately combined with minus 100-mesh MH–100 Hoeganaes iron powder in the ratio 70 volume percent iron to 30 volume percent $C_3S+ZnCrO_4$. The mixture was then sealed in a 1½″ stainless steel pipe section and hot-rolled at 1000° C. with size reduction as described for Examples 1–3, inclusive. Examples approximately 3″ x 2″ x ¼″ were dry-machined from the composite.

*Corrosion test.*—An iron control, an iron-tricalcium silicate-$ZnCrO_4$ composite, and an iron-tricalcium silicate composite were individually exposed to salt spray (5% NaCl) for 20 hours at room temperature, with results as follows:

*Iron control.*—Completely covered with heavy rust.

*Iron-tricalcium silicate composite.*—60% covered with moderate rust.

*Iron-tricalcium silicate-$ZnCrO_4$ composite.*—10% light rust on edges of sample, where there was incomplete compaction, and zero visible corrosion in the center surface where compaction was complete.

Example 5

It was postulated that a protective barrier gel formed as a result of hydration of the cement component of the composites of this invention, and this experiment was resorted to by way of proof of this thesis.

*Procedure.*—175 parts by weight of minus 100 mesh $3CaO \cdot SiO_2$ was ball-mixed for 4 hours with 30 parts by weight $ZnCrO_4$ and 20 parts by weight $ZnMoO_4$. The resulting mix was intimately combined with minus 100 mesh MH–100 Hoeganaes iron powder in the proportions 70 volume percent iron, 30 volume percent cement mix, then sealed in a stainless steel pipe section and hot-rolled from 1000° C. with size reduction as described for Examples 1–3, inclusive. Samples were dry machined from the resulting billet.

Figure 2:
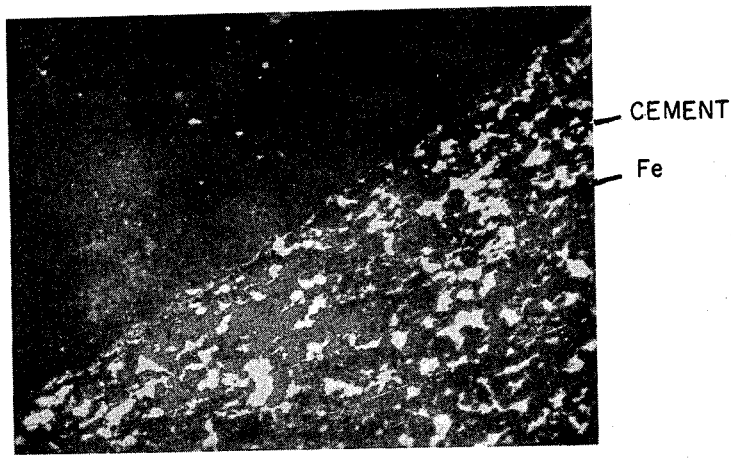
FIG. 2 is a photomicrograph (100×, polarized light) of an iron-cement composite specimen prepared by the method of this invention before exposure to water.

A segment was cut from one of the samples, mounted on edge, polished on the surface exposed by the cutting and photographed under 100X (polarized light) magnification, giving FIG. 2. The continuous integral nature of the iron matrix is very apparent in this view, the relatively smooth machined exterior surface of the sample appearing as the line extending diagonally from adjacent the lower left-hand to upper right-hand corners of the photograph.

Figure 3:
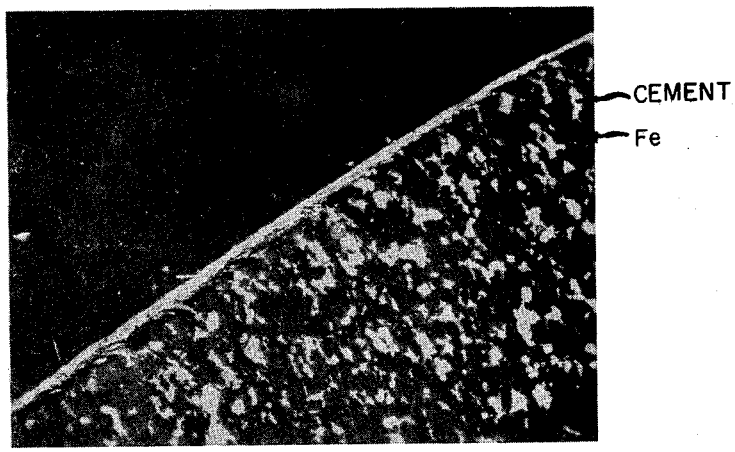
FIG. 3 is a photomicrograph (100×, polarized light) of a composite segment in all respects identical with that of FIG. 2, after exposure to water, showing the resulting development of a protective gel-like surface film.

The remainder of the sample was exposed to 5% salt spray for 22 hours. Only slight rusting occurred along the edges, with no rust in the central exposed surface of the sample. An edge view of a polished segment of this specimen, after test completion, prepared identically with that of FIG. 2, is shown in FIG. 3. The protective gel-like film covering the entire surface of the specimen which had been subjected to the salt spray is clearly visible as the while diagonal line of appreciable thickness running from the lower left-hand to the upper right-hand corners. It is especially significant that this film is not limited to regions adjacent the individual cement sites but, instead, extends in very uniform thickness over the entire exposed surface of the sample.

The protective film measures 10–20 microns in thickness and is so highly adherent that it survives water washing, steaming and at least moderate abrasion. Moreover, the film is transparent, so that coloration pursuant to the practice of U.S. Patent 3,165,821, supra, is entirely practicable.

Example 6

The purpose of this example was to show the regenerative capabilities of freshly formed surfaces of iron-cement composites after prolonged exposure to water and mechanical removal of the protective coating.

*Corrosion test.*—Sample H, described in Example 2, was saved following its test by immersion in water for 384 hours and was wet belt-sanded with 120-grit paper to remove any protective coating developed in the previous test. It was then partially submerged in water for 288 hours. Only two small pits developed during this testing. In contrast, an iron control began rusting in 2 hours, indicating that corrosion protection was continuously present in the iron-cement composite.

Example 7

The purpose of this testing was to obtain a comparison between the compositions of this invention and iron-concrete mixtures of the prior art.

Since one application of the prior art materials is as heat-conductive liners in rotary, internally fired kilns, as taught in U.S. Patent 2,633,347, wherein the lining consists of concrete containing, as aggregate, iron pieces of various sizes distributed throughout, several of the prior art speciments were fired for extended time periods at the high temperatures normally built up in such kilns. In this way, any improvement in stregnth properties which could possibly be attributed to the high temperature treatment could be detected over speciments receving no heat treatment.

A sample composite L was first prepared in accordance with this invention, this consisting of 70 volume percent minus 100-mesh MH–100 Hoeganaes iron powder and 30 volume percent Type I, or general use Portland cement (cf. five types of Portland cement in the classification described in "The Chemistry of Portland Cements" by R. H. Bogue, 2d edition, p. 25, supra). This mixture was well-sintered by hot-rolling at 1000° C., as hereinbefore described for Examples 1–3, inclusive.

For comparison with sample L, an Fe-concrete sample was next prepared by mixing 70 volume percent minus 100-mesh MH–100 Hoeganaes iron powder with 30 volume percent Type I Portland cement and then wetting the mixture with $H_2O$ to make a paste of consistency suitable for casting into a brick. After being allowed to set two weeks, this brick was milled into test bars for use as specimens M, N and O in the following table. Machinability of the cast brick was very poor, whereas specimens machined from sample composite L, prepared according to this invention, were readily made by conventional machining practice and had a good appearance.

The microstructures of the several specimens at the magnifications indicated are shown in FIG. 4, the dark areas being metal whereas the light areas are cement for FIG. 4(L), whereas the reverse is true for FIGS. 4(M) to 4(O), inclusive, i.e., the metal is light and the concrete dark. In order to determine the effect of high temperatures on the concrete, specimens N and O were heated to 650° C. and 1000° C., respectively, for 4½ hours each prior to testing as hereinafter described.

The comparative tests were of two general types: (1) transverse rupture and (2) resistivity ($\rho$) in ohm-cm.

The transverse rupture test was conducted according to the standard procedure set out in the "Metals Handbook," 1948 edition, published by the American Society for Metals, Cleveland 3, Ohio, starting at page 125, utilizing, however, a slightly shorter span of unsupported specimen length (i.e., 1″ as compared with 2.00″).

This test employs a constant velocity moving piston impinging on the mid point of a specimen supported at the ends on a pair of horizontally disposed ⅛″ dia. co-parallel cylindrical rods. An Instron Tensile Tester Model TTC was used, provided with a ⅛″ dia. plunger advanced at a rate of 0.05″/min. When failure occurs, the maximum load reading P in pounds is recorded, from which the transverse rupture strength value S is computed from the formula:

$$S = 3/2 \frac{PL}{BH^2}$$

where $P$ = maximum measured test load in lbs.,
$L$ = span of test sample in inches,
$B$ = beam width, inches, and
$H$ = beam thickness, inches.

The resistivity of the specimens was measured by the four-probe method described in Section 20.2 of "Handbook of Semiconductor Electronics," first edition, McGraw-Hill Book Co., Inc., New York, N.Y., edited by Lloyd P. Hunter. Duplicate specimens of compositions L, M and N were subjected to transverse rupture testing to minimize individual sample anomalies.

| Sample | Description | Thickness, in. | Width, in. | Transverse Rupture, p.s.i. | | Resistivity ohm-cm. |
|---|---|---|---|---|---|---|
| | | | | Spec. #1 | Spec. #2 | |
| L | Composite according to this invention | 0.212<br>0.213<br>0.212 | 0.508<br>0.511<br>0.512 | 35,525<br>29,095<br>30,975 | 32,895<br>21,985<br>33,260 | 9.6×10⁻⁴ |
| M | Fe-Concrete | 0.204<br>0.197 | 0.501<br>0.500 | 130<br>208 | 130<br>154 | |
| N | Fe-Concrete fired for 4½ hours at 650° C | 0.263<br>0.275 | 0.306<br>0.286 | 235 | 174 | 30.7 |
| O | Fe-Concrete fired for 4½ hours at 1,000° C | 0.257<br>0.271 | 0.282<br>0.280 | 3,630<br>2,145 | | 6.37×10² |

The high transverse-rupture strength values for the compositions of this invention are explainable on the basis of the resistivity measurements and the structures shown in FIG. 4, the latter clearly revealing the continuity of metal structure for Sample L as contrasted with the discontinuous make-ups of the Fe-concretes.

It is believed that the relative improvement in transverse rupture strength of specimens fired at 650° C. and 1000° C. is not significant, and is probably due to the formation of weak strength, brittle ceramic bonds between particles. The differences between the composites of this invention and concretes containing iron as aggregate are not confined solely to physical attributes. Essentially completed hydration resulting from the setting up of the concrete destroys practically all protective gel film formation capability and thus deprives the concretes of corrosion-inhibition protection.

The relatively pronounced roughness of the exterior milled surfaces of the concrete iron samples is evident from the appearance of these surfaces at the left-hand edge of FIG. 4(N) and also the right-hand edge of FIG. 4(O). Rough surfaces of this nature are, of course, more subject to corrosive attack and, moreover, are less easily shielded from outside environments by self-developed barrier formation, especially when the capability for development of the latter is essentially zero.

*Example 8*

The additional benefit obtained by incorporating a powdered glass constituent in the metal-cement composites of this invention is illustrated by this example. It is apparent that not only is the corrosion resistance improved but the strength is also benefited as a result of the increased binding effect contributed by the glass.

*Procedure.*—In accordance with the practice of this invention, 85 gms. of minus 100-mesh tricalcium silicate was dry ball-milled for 2 hours with 15 gms. of minus 100-mesh $ZnCrO_4$, 10 gms. $ZnMoO_4$ and 40 gms. of a eutectic glass mixture selected for its non-silicon formulation, all in the presence of a sufficient amount of glycol to avoid segregation of the heavy particles from the light during mixing. The glass analysis, in percent by weight, was: $Al_2O_3$ 47.0, CaO 41.0, BaO 7.4 and $Na_2O$ 4.6. The softening point of the glass was 900–1100° C.

After mixing, 96 gms. of the resulting batch was intimately stirred into 545 gms. of minus 100-mesh MH–100 Hoeganaes iron powder preparatory to obtaining a composite containing 70 volume percent iron. The inhibited Fe-cement-glass mixture was loaded into a 1½″ dia. stainless steel pipe 9″ long, and the glycol removed by heating to 150° C. in vacuum. The pipe was then sealed at both ends to exclude oxygen, heated over a period of 45 minutes to a temperature of 900° C. and hot-rolled to ¼″ thickness, thereby sintering the charge to a dense composite which was removed by sawing away the stainless steel pipe external casing. Test specimens machined from this sample had an excellent appearance and displayed transverse rupture strengths in excess of 30,000 p.s.i.

Corrosion testing was conducted at room temperature in a neutral 5% NaCl spray applied via a fogging nozzle for a period of 140 hours. With the exception of a single light-brown center streak which emanated from an edge defect in the worst of the corrostion-tested specimens, essentially no rusting occurred in this test. In contrast, samples of 1020 steel and of sintered iron alone formed from MH–100 iron powder began rusting within 8 hours and continued rust deterioration progressively.

*Example 9*

This example compares wrought iron with the compositions of this invention.

A specimen of wrought iron was obtained, this being prepared by the conventional Aston process described in "The Making, Shaping and Treating of Steel," 7th edition, published in 1957 by the U.S. Steel Corporation, Pittsburgh, Pennsylvania, chapter 11, section 9, pp. 215–219. Wrought iron is a composite of iron with an iron silicate slag analyzing, typically, about 72% ferrous and ferric oxides, 1.3% magnesia and only traces of lime, the small remaining balance being manganous oxide, phosphoric acid and sulfur compounds (refer to "The Making, Shaping and Treating of Steel" reference supra, 5th edition, copyrighted 1940 by the Carnegie-Illinois Steel Corp., a subsidiary of U.S. Steel Corp., Table 56, p. 314). The iron silicate ingredient of wrought iron contains no significant amount of lime or other alkaline earth, and is completely inactive hydraulically, having no tendency to form cement-like materials.

A test specimen of composition according to this invention was secured, this being a piece of the $C_3S$ cement-powdered iron composite, Sample K of Example 3, which had stood idly on the laboratory shelf for some fifteen months, exposed quite often to atmospheric humidities of the order of 100%, so that at least some diminution of corrosion-inhibitory effectiveness might well have been expected.

Each specimen was wet-ground with 80 grit paper immediately prior to testing and then inserted in its own individual container filled with distilled water to an immersion of about half sample length, the upper halves of the specimens being exposed to the atmosphere. After approximately 16 hours at 75° F. there was no trace whatever of corrosion as regarded the specimen of inventive composition, whereas the submerged half of the commercial wrought iron specimen was heavily darkened with a coating which ranged from brown to blue-gray in color. Also, the length of wrought iron extending above the water line was lightly rusted in parts and heavily pitted in other parts, while a heavy layer of brown rust had formed at the air-water interface.

The water in which the wrought iron specimen was immersed was colored brown, and a light brown precipitate, presumably iron oxide or hydroxide, covered 30% of the bottom of the container. The water in contact with the specimen of this invention was completely clear and free from any visible precipitate.

Example 10

The corrosion-inhibition capability hereinbefore demonstrated for iron is not confined to that metal, this example teaching a parallel effect for aluminum.

The non-metallic component of these composites was prepared utilizing two different glass components of analyses as follows:

| | For Samples Q, R and S | For Sample T |
|---|---|---|
| $SiO_2$ | 21.25 | 21.25 |
| $Na_2CO_3$ | 27.00 | 27.00 |
| $K_2CO_3$ | 10.25 | 10.25 |
| $Li_2CO_3$ | 3.25 | 3.25 |
| $NaNO_3$ | 2.25 | 2.25 |
| $BaCO_3$ | 11.25 | 11.25 |
| $TiO_2$ | 20.50 | 15.50 |
| $H_3BO_3$ | 2.25 | 2.25 |
| $Sb_2O_3$ | 1.00 | nil |

100 parts by weight of glass was mixed with 30 parts tricalcium silicate and 10 parts $ZnCrO_4$, a corrosion-inhibiting additive, by dry ball-milling for 4 hours. Billets 2″ x 1½″ x 1″ were cold pressed from this dry mix at 120,000 lbs. and then sintered at 540° C. for 1 hour, following which they were reground to pass a 100-mesh screen. The ground product was then mixed, in the proportions indicated in the following table, with minus 100-mesh Type 1100 aluminum powder, mixing being continued until completely uniform distribution of the powders was obtained. As a final step, billets were cold pressed from the inhibited Al-cement-glass mixture, heated to 560° C. for 30 minutes and then die-forged hot. Prior to corrosion testing, the surfaces of the specimens cut from these billets were wet sanded on a 240-grit SiC sanding paper.

Sample P was the control, which was simply sintered aluminum, hot forged to approximately the same density as the composite specimens to which it was to be compared.

| Sample | Glass+$C_3S$+$ZnCrO_4$ gms. | Type 1100 Al, gms. | Volume Percent Non-Metallic Component |
|---|---|---|---|
| P | 0 | 260 | 0 |
| Q | 13 | 256 | 5 |
| R | 39 | 230 | 15 |
| S | 72 | 200 | 25 |
| T | 40 | 230 | 15 |

The corrosion test applied was a modified Cass test, wherein a salt spray at 70° F. room temperature (instead of 120° F.) was applied continuously to the samples over a period of 23 hours.

As was to be expected, control sample P was the worst of the group and ended the test heavily streaked with white corrosion products. Sample T was the best of the group, suffering no visible corrosion and no change of luster over the starting material. Sample S was not quite as good as T, which had an appreciably lower volume percent of non-metallic component, demonstrating the high corrosion-inhibiting capability of the more soluble glass employed in Sample T. Samples Q and R were intermediate P and S, being generally quite resistant to corrosion, although not completely immune thereto. A second control sample made up from powdered aluminum and glass of the same composition as used for Sample T, plus $ZnCrO_4$ but devoid of any cement, suffered some change in surface appearance and was thus deemed somewhat inferior to cement-containing samples.

The sintered metal-cement composites of this invention resemble the metal constituent therein very closely in appearance, except that they are of somewhat flatter sheen. As regards machining properties, the products can be drilled or formed on a lathe, shaper, planer or other conventional machining apparatus with the same tools and using the same techniques as required for the metal component. It is true that the cement constituent of the composites is somewhat abrasive to forming tools; however, this can be largely overcome by incorporating a glass in minor amount (e.g., 2–5% by volume) as an additional component. The addition of such a glass makes it practicable to even hot-extrude the composites of this invention, since glass has a decided lubricating action at the temperature involved.

In general, the degree of hot working producing sintered composites of uniform integral bonding throughout should be of an order reducing the thickness of the powdered metal-cement mixture as received approximately 50%, while even greater reductions are positively beneficial in increasing the product density in order to obtain the best strengths and machining characteristics.

It is surprising that the aluminum metal of the composite of this example was not attacked by uncombined $Ca(OH)_2$ liberated by the cement component; however, there was no evidence of this. In any case, excessive calcium hydroxide liberation can be effectively avoided by the utilization of pozzolanic cements of the type such as those manufactured in Italy from lime mixtures with certain volcanic siliceous earths, denoted generically as "pozzolana." These cements are hydraulically active but form much smaller amounts of calcium hydroxide during hydration, and, in addition, possess a high resistance to attack by sea water, which can be an important incidental advantage.

Example 11

This example evaluates the cement paint adherence of the composites of this invention.

The cement paints referred to are those which incorporate substantial amounts of Portland cement suspending in water, these being typified by products such as that sold under the trade name "Quickseal," manufactured by Standard Dry Wall Products, Inc., New Eagle, Pa.

Two specimens were subjected to test, these being ¼″ thick sheets, each of which was freshly sanded to the same surface roughnesses by use of an 80-grit sanding belt. One sample was conventional cold-rolled steel, whereas the other was an iron-cement composite of analysis J, Example 3.

The "Quickseal" cement paint was made up by slurrying the manufacturer's dry powder in water and then brushing it onto one side only of the two test samples, which were afterwards allowed to dry in the atmosphere. When drying was complete, the individual samples were held upright by hand and then struck repeatedly very sharply on their back (unpainted) surfaces with a ½ lb. ball peen hammer having an approximately ½″ dia. ball head. The cement paint was completely removed from the immediate area of impact of the cold-rolled steel sample, exposing the bare metal and demonstrating the inadequacy of the bond. In contrast, the metal-cement composite of this invention withstood the blows without any sign of paint loss through flaking, even though the blow impacts were so heavy as to cause the paint coat to spall within itself, but not at the composite-paint interface.

While the foregoing description has been devoted exclusively to the preparation of homogeneous metal-cement composites, application to metal substrates in accordance with the teachings of U.S. patent application Ser. No. 403,020 by pressing hot particulate metal-cement composite material into a hot metal substrate sheet or other mass, so that the particles embed in substantially co-planar relationship with the substrate, is entirely feasible. Moreover, paints incorporating particulate metal-cement composites afford a means of protecting existing structures, and a very great range of formulations of these is practicable, all in accordance with the skill of the paint art.

The term "non-hydrated cement" as employed in the claims is intended to comprehend broadly all cements wherein hydration has not been carried past a point depriving the cement of a residual capability for development of a protective gel-like surface film. As the examples hereinbefore set out reveal, this capability for protective gel formation is very durable, surviving, as it does, very lengthy periods of water immersion and severe abrasive scarification of the surfaces of the composites, so that it indeed constitutes a very lasting characteristic of the composites of this invention.

The film developing capability is apparently completely independent of the presence or absence of co-existing glass or ionizable corrosion inhibitor added to the cement-metal powder mixes prior to compositing. In this connection, microscopic examination of specimens subjected to water immersion revealed no visually perceptible differences in protective film formation as regards either continuity or thickness where (1) a relatively unleachable bottle glass was incorporated as a sole additive (constituting approximately 10 volume percent of the total unsintered mix) to an iron-cement composite or (2) for a $C_3S$ cement composition K plus iron made up in the proportions reported in Example 3, which was entirely free of both glass and any accessory corrosion inhibitor.

Where the word "ionizable" is employed in the claims in designation of the accessory corrosion inhibitors, e.g., the chromates, phosphates, tungstates, molybdates and alkaline earths, it will be understood that some virtually totally insoluble compounds containing these inhibitory groups can be employed in the first instance to introduce the substances into the pre-sintered powder mixtures. Thereafter, either the intense heating accompanying the sintering process, or interaction of the inhibitors with the co-present cement or glass components, or with products of the latter formed during exposure to moisture, are either singly or in combination amply effective to present for ionic release the relatively small amounts necessary to confer corrosion inhibition.

From the foregoing, it is apparent that this invention is capable of relatively wide modification within the skill of the art without departure from its essential spirit, and it is intended to be limited only within the scope of the appended claims.

What is claimed is:

1. A manufacture of improved corrosion resistance comprising a sintered metal-nonhydrated cement composite having a substantially continuous metal structure throughout which the cement is occluded in very intimate association wherein said cement is of inorganic composition and possessed of hydraulic activity developing an adherent, substantially continuous gel-like film over the surface of said composite consequent to hydration upon exposure to moisture, adjacent sites of said cement within said metal being separated at spacings not exceeding about 0.2 mm.

2. A manufacture of improved corrosion resistance comprising a sintered metal-nonhydrated cement composite according to claim 1 containing, additionally, an ionizable, corrossion-inhibiting substance.

3. A manufacture of improved corrosion resistance comprising a sintered metal-nonhydrated cement composite having a substantially continuous metal structure throughout which the cement is occluded in very intimate association wherein said cement comprises a member of the group consisting of dicalcium silicate and tricalcium silicate, adjacent sites of said cement within said metal being separated at spacings not exceeding about 0.2 mm.

4. A manufacture of improved corrosion resistance comprising a sintered metal-nonhydrated cement composite according to claim 3 containing, additionally, an ionizable, corrosion-inhibiting substance.

5. A manufacture of improved corrosion resistance comprising a sintered metal-nonhydrated cement composite according to claim 3 containing, additionally, an ionizable, corrosion-inhibiting substance taken from the group consisting of chromates, phosphates, tungstates, molybdates and alkaline earths.

6. A manufacture of improved corrosion resistance comprising a sintered metal-nonhydrated cement composite according to claim 1 wherein the metal constituent is one of the group consisting of iron and aluminum.

7. A manufacture of improved corrosion resistance comprising a sintered metal-nonhydrated cement composite according to claim 1 containing, additionally, glass having a softening point in the range of the sintering temperature of said metal.

References Cited

UNITED STATES PATENTS

| 1,470,378 | 9/1923 | Kleinlogel | 106—97 |
| 2,023,001 | 12/1935 | Billner | 106—97 |
| 2,633,347 | 3/1953 | Heyman | 106—97 X |
| 3,019,103 | 1/1962 | Alexander et al. | 29—182.5 X |
| 3,166,518 | 1/1965 | Barnard | 106—97 X |
| 3,205,566 | 9/1965 | Breton | 29—182.5 |
| 3,294,496 | 12/1966 | Berghezan | 29—182.5 |
| 3,295,934 | 1/1967 | Bre | 29—182.5 |

CARL D. QUARFORTH, *Primary Examiner.*

R. L. GRUDZIECKI, *Assistant Examiner.*